United States Patent
Hung

(10) Patent No.: US 9,885,379 B1
(45) Date of Patent: Feb. 6, 2018

(54) EYEHOOK

(71) Applicant: YOKE INDUSTRIAL CORP., Taichung (TW)

(72) Inventor: Wei-Chieh Hung, Taichung (TW)

(73) Assignee: YOKE INDUSTRIAL CORP., Taichung (TW)

( * ) Notice: Subject to any disclaimer, the term of this patent is extended or adjusted under 35 U.S.C. 154(b) by 67 days.

(21) Appl. No.: 15/226,647

(22) Filed: Aug. 2, 2016

(51) Int. Cl.
*B42F 13/00* (2006.01)
*F16B 45/02* (2006.01)
*H01B 17/62* (2006.01)

(52) U.S. Cl.
CPC ............ *F16B 45/02* (2013.01); *H01B 17/62* (2013.01)

(58) Field of Classification Search
USPC .......................................... 248/339
See application file for complete search history.

(56) References Cited

U.S. PATENT DOCUMENTS

| | | | | |
|---|---|---|---|---|
| 2,490,931 A | * | 12/1949 | Thompson | F16B 45/02 24/599.5 |
| 5,257,441 A | * | 11/1993 | Barlow | F16B 45/02 24/599.5 |
| 5,579,564 A | * | 12/1996 | Rullo | F16B 45/02 24/599.4 |
| 6,161,264 A | * | 12/2000 | Choate | F16B 45/02 24/599.5 |
| 9,032,595 B2 | * | 5/2015 | Lin | F16B 45/02 24/599.5 |
| 9,199,105 B1 | * | 12/2015 | Hung | A62B 35/0068 |
| 2008/0104809 A1 | * | 5/2008 | Lin | F16B 45/02 24/600.1 |
| 2012/0102688 A1 | * | 5/2012 | Yang | F16B 45/02 24/600.1 |
| 2012/0210542 A1 | * | 8/2012 | Yang | F16B 21/165 24/369 |
| 2013/0160252 A1 | * | 6/2013 | Lin | F16B 45/02 24/601.5 |
| 2013/0219673 A1 | * | 8/2013 | Perner | F16B 45/02 24/375 |
| 2016/0230804 A1 | * | 8/2016 | Huang | F16B 45/02 |

* cited by examiner

*Primary Examiner* — Monica E Millner
(74) *Attorney, Agent, or Firm* — Tracy M. Heims; Apex Juris, pllc.

(57) ABSTRACT

An eyehook includes a main hook, a gate, and a switch. The main hook includes a first portion, a second portion, and has an opening thereon. The gate is pivotally connected to the second portion, and movable between a first and a second position. When the gate is moved to the second position, the opening is closed. A first main body is clad in a first insulating coat which has a first abutting portion. The switch is pivotally connected to the first portion, and movable between a third and a fourth position. A second main body of the switch is clad in a second insulating coat. The switch abuts against the first abutting portion when moved to the third position to prevent the gate from moving toward the first position. The switch includes a covering portion covering the first abutting portion when the gate is moved to the first position.

20 Claims, 9 Drawing Sheets

EYEHOOK

BACKGROUND OF THE INVENTION

1. Technical Field

The present invention relates generally to a hanging tool, and more particularly to an eyehook with sufficient structural strength, which ensures the safety in use.

2. Description of Related Art

Generally, conventional eyehooks are made of rigid metal to offer good durability and to prevent possible accidents. However, eyehooks made of metal are heavy and conductive to electricity, which may cause serious injuries when accidentally contact with electrical current. In light of this, a type of eyehook is improved to have a clad layer made of insulating materials, which not only avoids the aforementioned hazard but also reduces the weight of the eyehook. Moreover, to prevent the object hung on an eyehook from falling off, such improved eyehooks usually further include a safety. Thus, the hung object cannot be taken down unless the safety is deactivated.

However, if the structure of the safety is not well designed, the user may get pinched while trying to deactivate the safety. Additionally, the structural strength of this type of improved eyehooks may be decreased because less metal is used therein. In this case, if such an eyehook is forcefully hit, the structure is prone to get damaged, and the safety may even fail to function normally.

Therefore, the conventional eyehooks have to be further improved to increase the structural strength while keeping the function of insulation to enhance the safety in use.

BRIEF SUMMARY OF THE INVENTION

In view of the above, the primary objective of the present invention is to provide an eyehook, which is insulating and lightweight, and has sufficient structural strength to ensure the safety in use.

The present invention provides an eyehook, which includes a main hook, a gate, and a switch. The main hook includes a first portion, a second portion, and a hook portion, wherein the main hook has an opening provided thereon. The gate is pivotally connected to the second portion of the main hook, wherein the gate is pivotally movable between a first position and a second position. When the gate is moved to the second position, a free end thereof abuts against an inner side of a free end of the hook portion to close the opening. The gate includes a first main body and a first insulating coat, wherein the first main body is clad in the first insulating coat; the first insulating coat has a first abutting portion. The switch is pivotally connected to the first portion of the main hook, wherein the switch is pivotally movable between a third position and a fourth position. The switch includes a second main body and a second insulating coat, wherein the second main body is clad in the second insulating coat, and the second insulating coat has a second abutting portion. When the switch is moved to the third position, the switch abuts against the first abutting portion of the first insulating coat to prevent the gate from pivotally moving from the second position toward the first position. The switch further includes a covering portion, which covers the first abutting portion when the gate is moved to the first position.

The present invention further provides an eyehook, which includes a main hook, a gate, and a switch. The main hook includes a first portion, a second portion, and a hook portion, wherein the first portion is provided between the second portion and the hook portion. The main hook has an opening provided thereon. The gate is pivotally connected to the second portion of the main hook, wherein the gate is pivotally movable between a first position and a second position. When the gate is moved to the second position, a free end thereof abuts against an inner side of a free end of the hook portion to close the opening. The gate includes a first main body and a first insulating coat, wherein the first main body is clad in the first insulating coat; the first insulating coat has a first abutting portion. The switch is pivotally connected to the first portion of the main hook, wherein the switch is pivotally movable between a third position and a fourth position. The switch includes a second main body and a second insulating coat, wherein the second main body is clad in the second insulating coat, and the second insulating coat has a second abutting portion. When the switch is moved to the third position, the switch abuts against the first abutting portion of the first insulating coat to prevent the gate from pivotally moving from the second position toward the first position. The switch is pivotally connected to the main hook through a pin. The first main body has a first outer surface beneath the first abutting portion. When the gate abuts against the switch, a vertical line on the first outer surface passes through the pin.

The present invention further provides an eyehook, which includes a main hook, a gate, and a switch. The main hook includes a first portion, a second portion, and a hook portion, wherein the first portion is provided between the second portion and the hook portion. The main hook has an opening provided thereon. The gate is pivotally connected to the second portion of the main hook, wherein the gate is pivotally movable between a first position and a second position. When the gate is moved to the second position, a free end thereof abuts against an inner side of a free end of the hook portion to close the opening. The gate includes a first main body and a first insulating coat, wherein the first main body is clad in the first insulating coat. The first insulating coat has a first abutting portion. The switch is pivotally connected to the first portion of the main hook, wherein the switch is pivotally movable between a third position and a fourth position. The switch includes a second main body and a second insulating coat, wherein the second main body is clad in the second insulating coat, and the second insulating coat has a second abutting portion. When the switch is moved to the third position, the switch abuts against the first abutting portion of the first insulating coat to prevent the gate from pivotally moving from the second position toward the first position. The switch has a rotation axis, and the first main body has a first outer surface beneath the first abutting portion. When the gate abuts against the switch, a perpendicular foot of the first outer surface passing through the rotation axis falls on the first outer surface.

Whereby, the eyehook has an insulating outer layer for improving the safety in use. Moreover, when the gate abuts against the switch, a component force of a force acting on the switch would pass through the pivot point of the main hook and the switch, which generates no rotation torque, and therefore increase the intensity of the eyehook, and reduce the chance of cracking the eyehook.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

As shown in FIG. 1 to FIG. 9, the eyehook 100 is an electrically insulating safety, which is designed to prevent current conduction while contact with electrical current, and thus avoid possible injuries.

Figure 1:
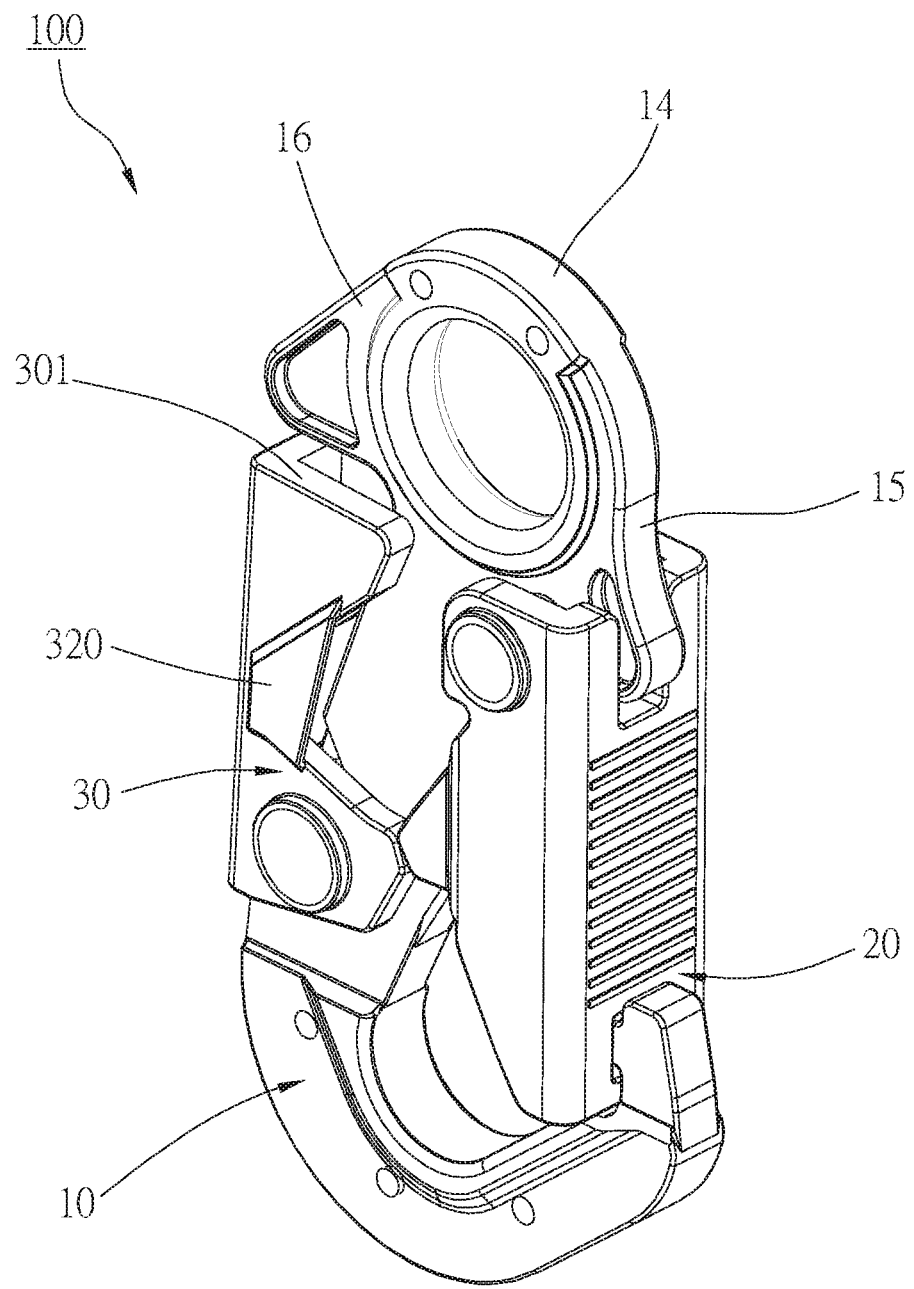
FIG. 1 is a perspective view of an embodiment of the present invention, showing the eyehook.
Figure 2:
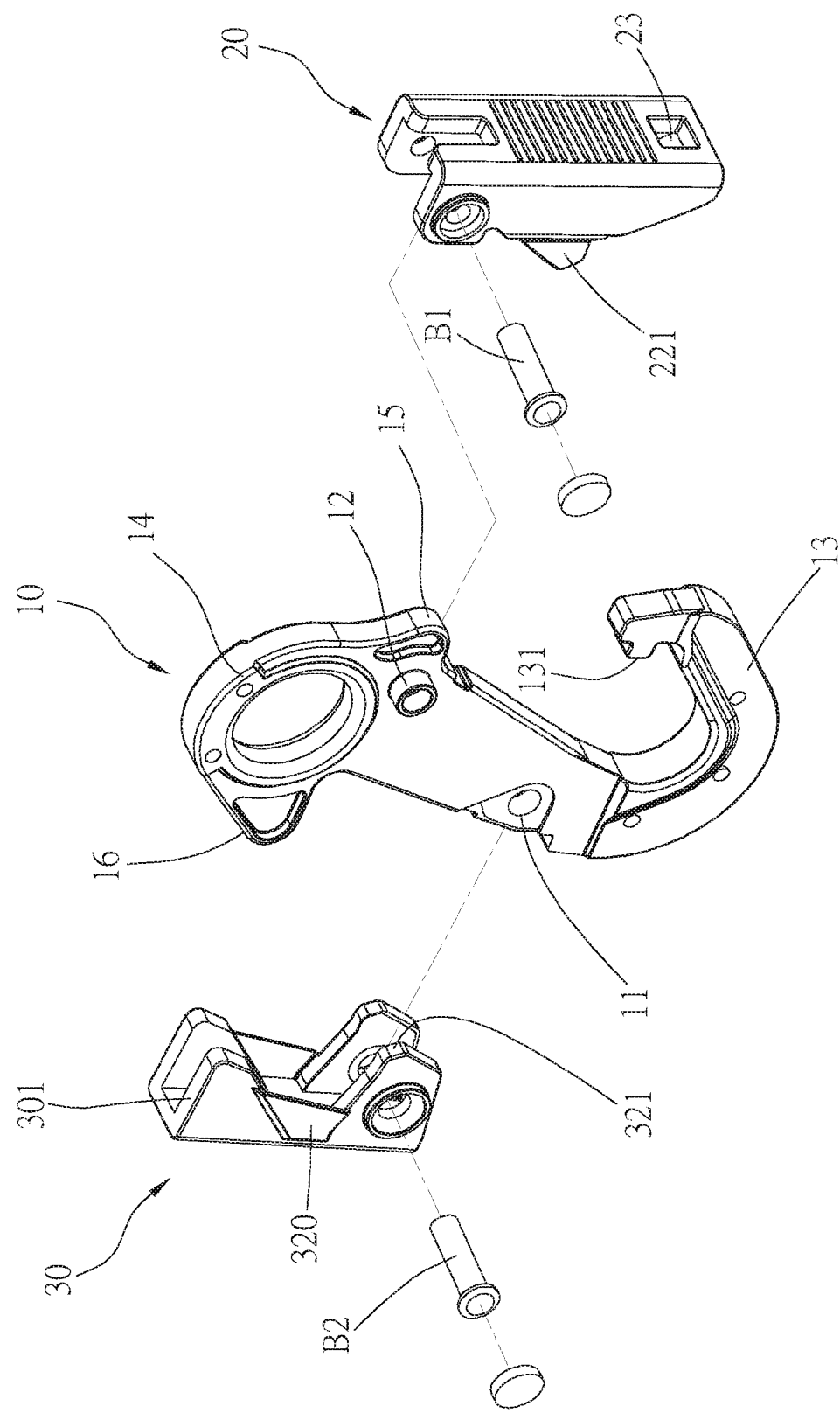
FIG. 2 is a exploded view of the eyehook in FIG. 1.

As shown in FIG. 1 and FIG. 2, the eyehook 100 includes a main hook 10, a gate 20, and a switch 30. The main hook 10 has an insulating outer layer, and includes a first portion 11, a second portion 12, a hook portion 13, and a hanging ring 14. The first portion 11 is provided between the second portion 12 and the hook portion 13; the second portion 12 is provided between the first portion 11 and the hanging ring 14, and a first protrusion 15 is provided outside of the second portion. The first protrusion 15 has a hollow portion, which does not affect the intensity of the eyehook 100, in order to reduce the weight and the amount of materials of the eyehook 100. The hook portion 13 is hook-shaped and used to hang on an object. The hanging ring 14 is adapted to be passed through by a hanging rope, or connected to another hook. Moreover, the hanging ring 14 has a second protrusion 16 protruded out of the outer surface thereon, wherein the second protrusion 16 also has a hollow portion, which has the same function as that of the first protrusion 15.

Figure 3:
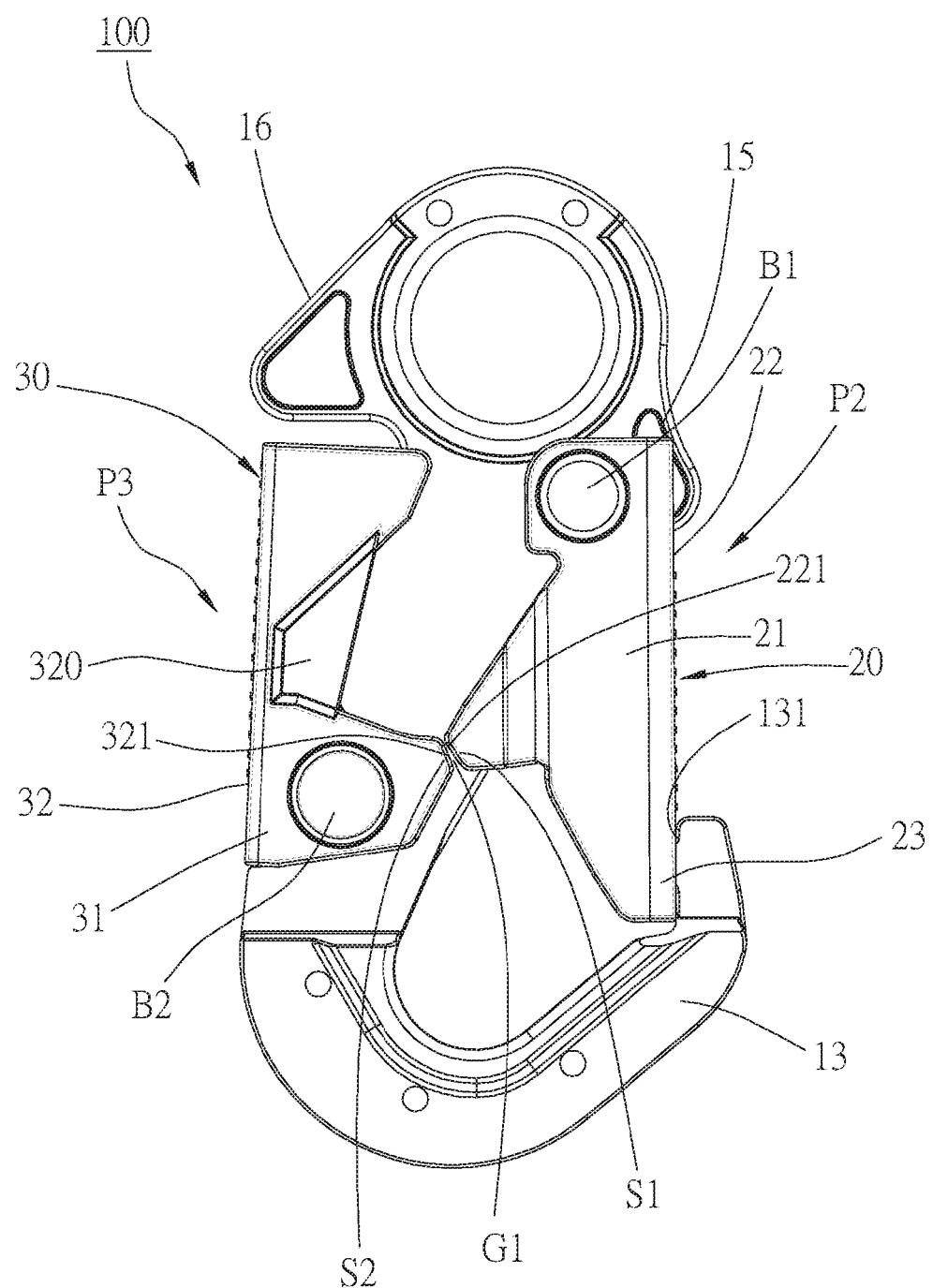
FIG. 3 is a front view of the embodiment, showing that when the gate is moved to the second position, and the switch is moved to the third position, the gap is formed between the first abutting portion and the second abutting portion.
Figure 8:
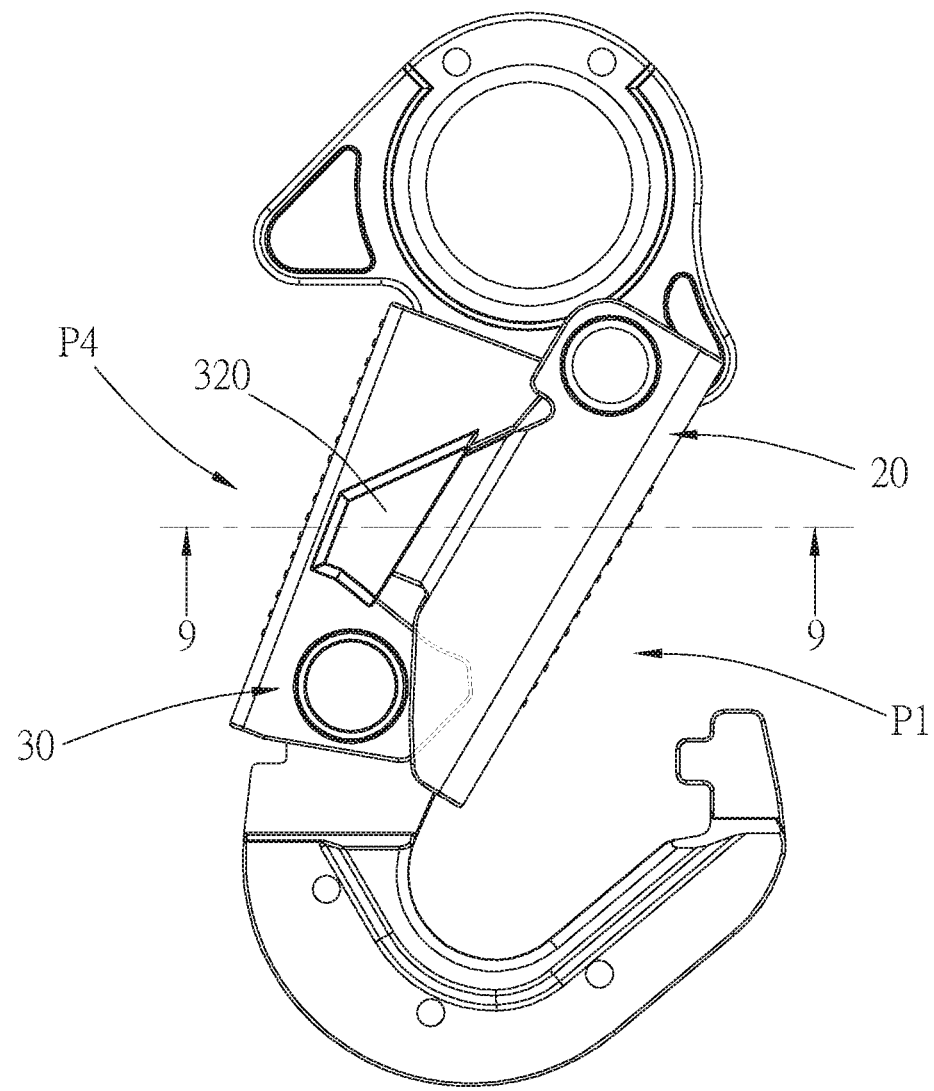
FIG. 8 is a schematic diagram of the embodiment, showing the covering portion of the switch covers the first abutting portion of the gate when the gate is moved to the first position.

As illustrated in FIG. 2, FIG. 3, and FIG. 8, an end of the gate 20 is pivotally connected to the main hook 10 through a pin B1 passing through the second portion 12 of the main hook 10, and the gate 20 is thus pivotally movable between a first position P1 (shown in FIG. 8) and a second position P2 (shown in FIG. 3), wherein the pin B1 is the pivot point. In the embodiment, when the gate 20 is moved to the second position P2, the first protrusion 15 extends out of an outer surface of the gate 20, which prevents the gate 20 from pivoting by an accidental hit.

Figure 9:
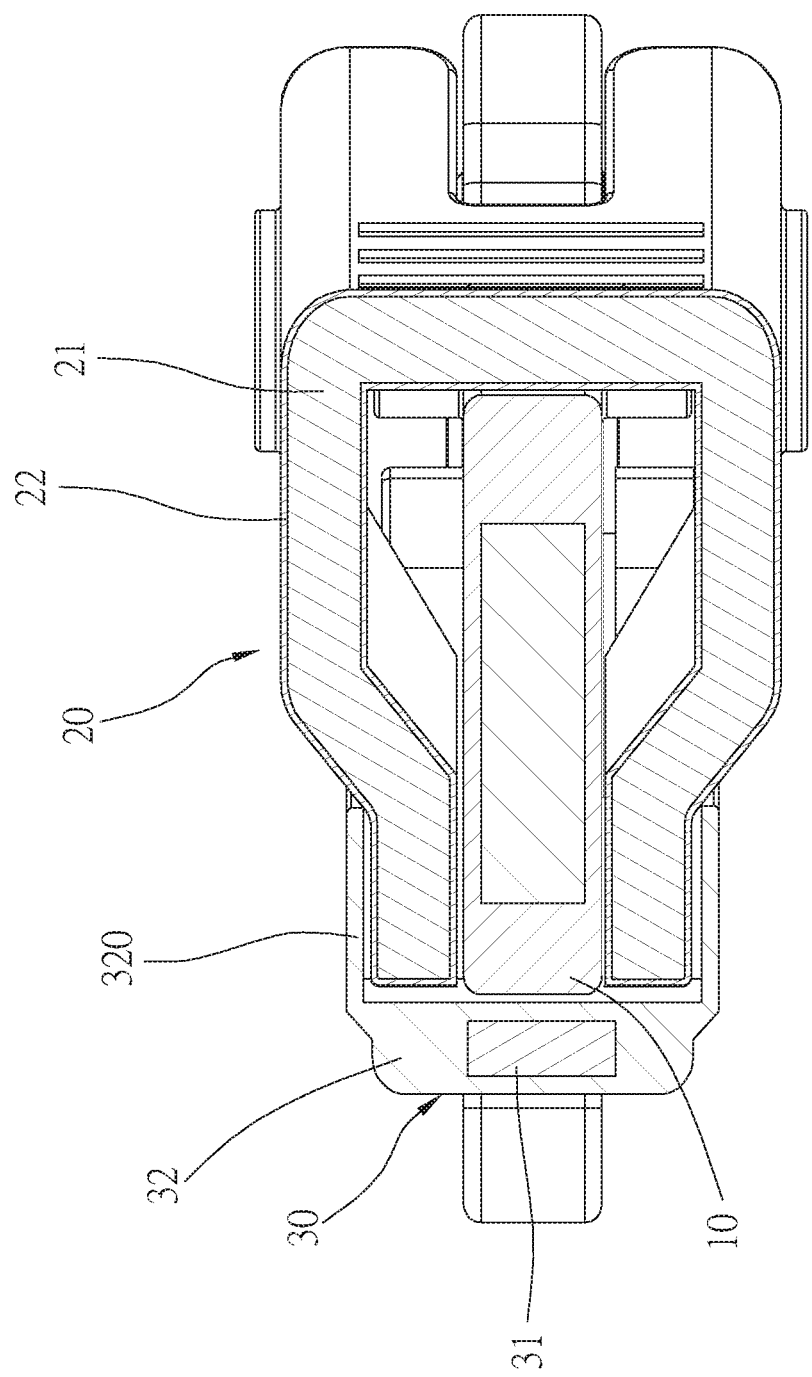
FIG. 9 is a sectional view along the 9-9 line in FIG. 8.

The gate 20 is elongated, and a sectional shape of the gate 20 depicted in FIG. 9 is U-shaped. The gate 20 includes a first main body 21, which is clad in a first insulating coat 22, wherein the first main body 21 is rigid, and made of metal. The first insulating coat 22 has two first abutting portions 221, wherein the first main body 21 has a first outer surface S1 beneath each of the first abutting portions 221. In other words, the first outer surface S1 is cover by the first insulating coat 22. When the gate 20 is moved to the first position P1, an opening of the eyehook 100 is exposed, and an object can be hung on or taken down through the opening. When the gate 20 is moved to the second position P2, a free end 23 thereof abuts against an inner side of a free end 131 of the hook portion 13 to close the opening, which prevents the hung object from falling off from the hook portion 13.

Figure 5:
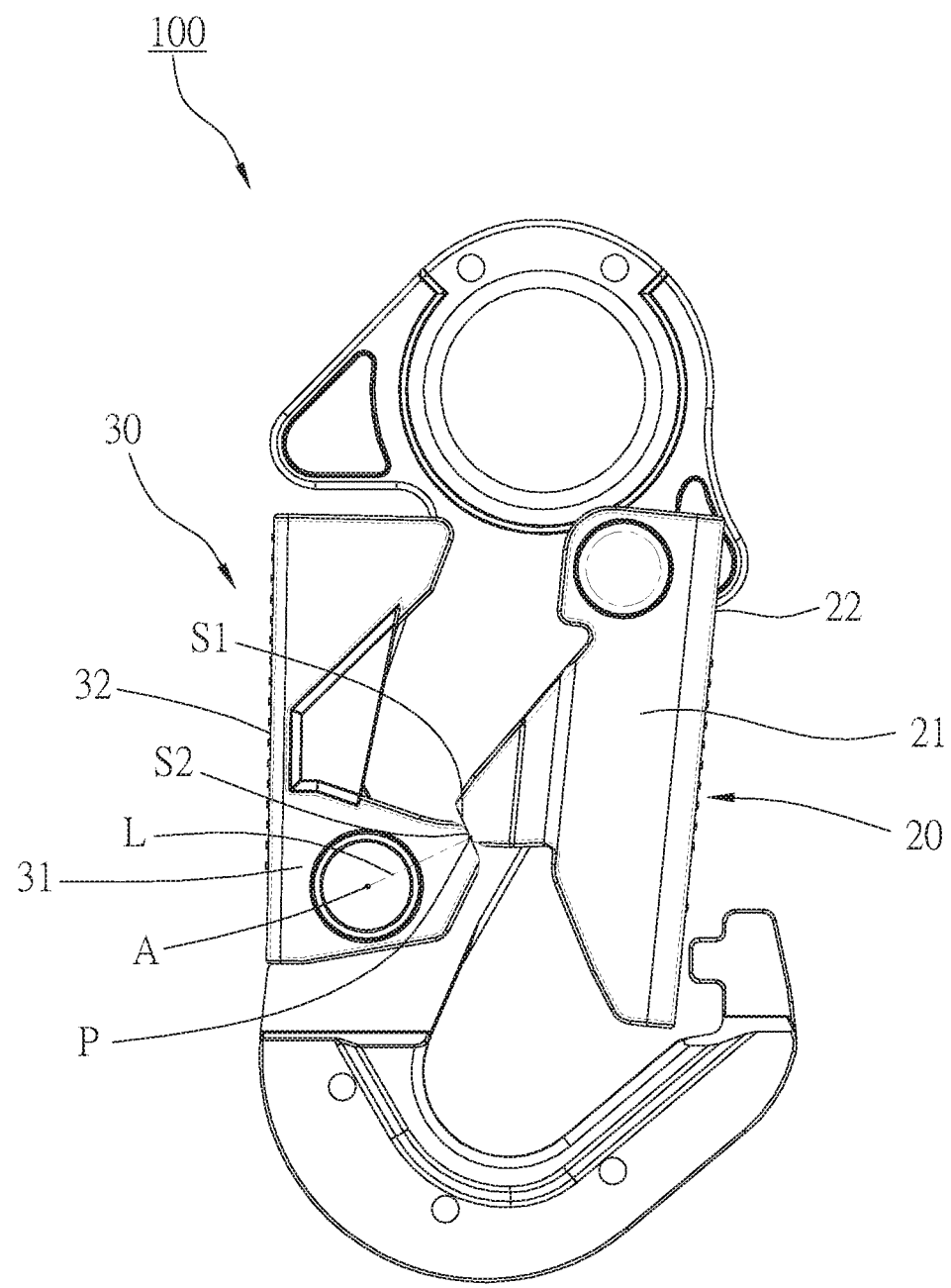
FIG. 5 is a schematic diagram of the embodiment, showing gate is pivotally movable.
Figure 6:
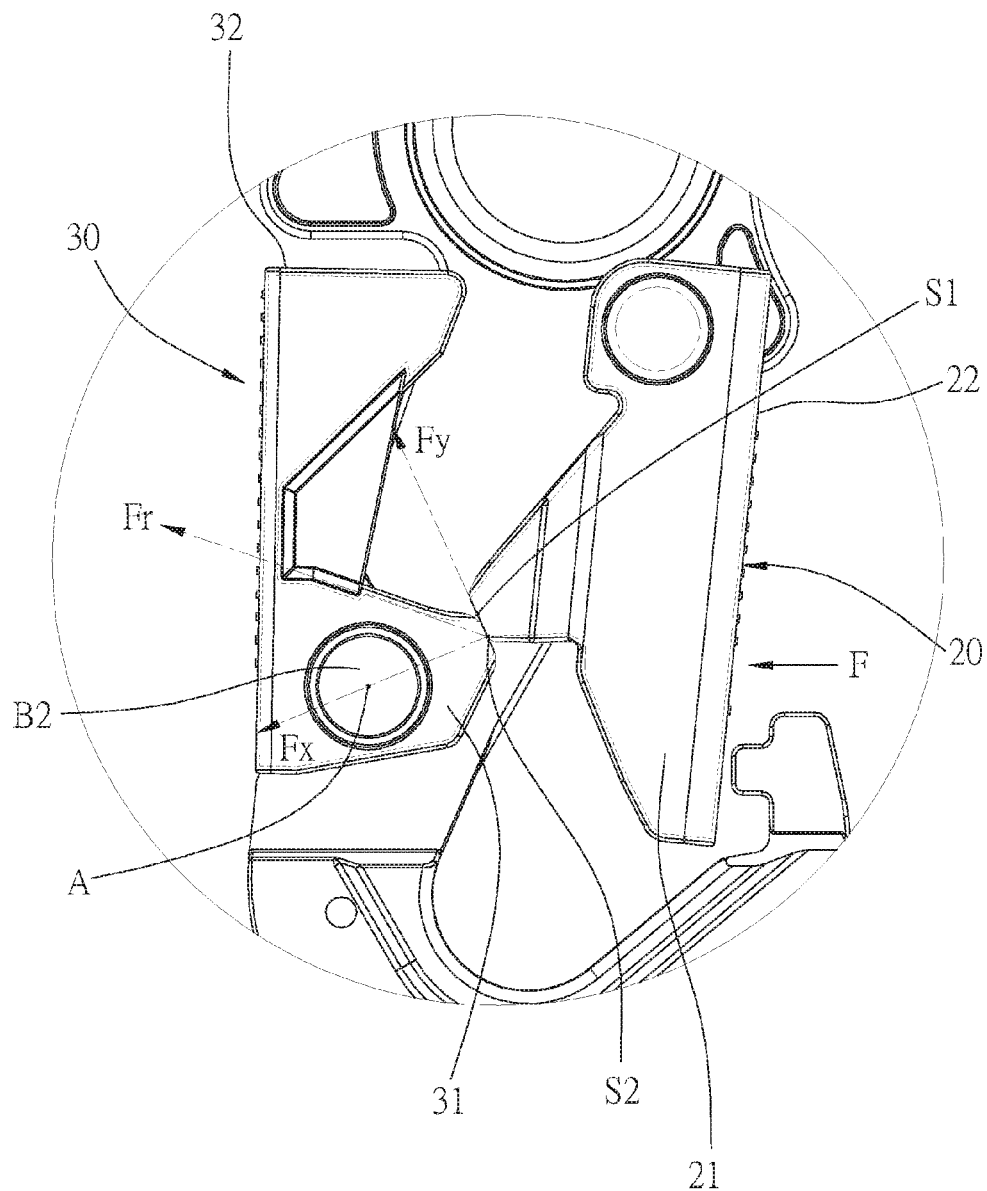
FIG. 6 is a partially enlarged view of FIG. 5, showing the first outer surface of the first main body abuts against the second outer surface of the second main body.
Figure 7:
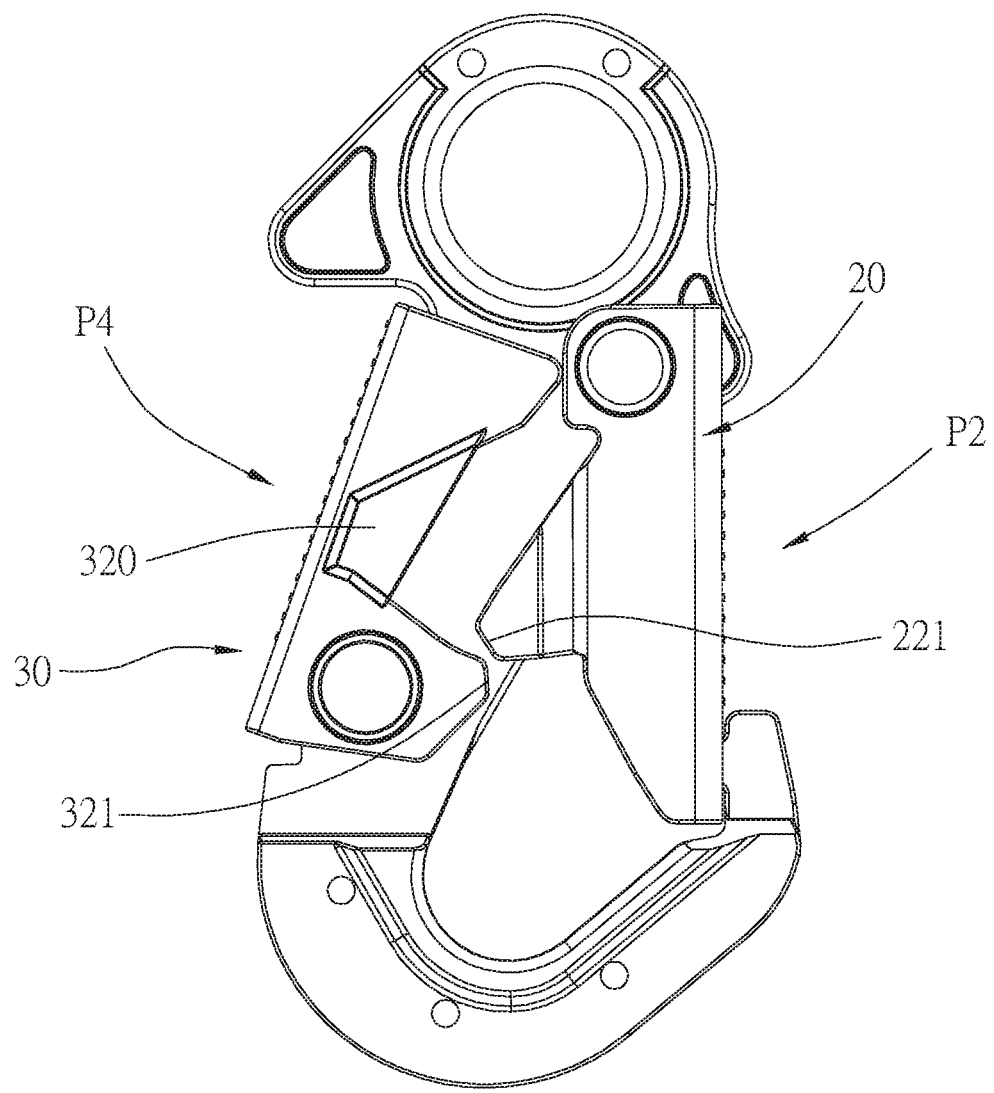
FIG. 7 is a schematic diagram of the embodiment, showing the switch is moved to the fourth position, and the second abutting portion of the switch is away from the first abutting portion of the gate.

An end of the switch 30 is pivotally connected to the main hook 10 through a pin B2 passing through the first portion 11 of the main hook 10, and the switch 30 is thus pivotally movable between a third position P3 (shown in FIG. 3) and a fourth position P4 (shown in FIG. 8). In the embodiment, when the switch 30 is moved to the third position P3, the second protrusion 16 extends out of an outer surface of the switch 30 on a side opposite to where the switch 30 is pivotally connected to the main hook 10, which prevents the switch 30 from pivoting by an accidental hit. As shown in FIG. 5 and FIG. 6, the switch 30 has a rotation axis A falling on the pin B2. When the first outer surface S1 abuts against the second outer surface S2, a perpendicular foot P of the first outer surface S1 passing through the rotation axis A falls on the first outer surface S1.

In the embodiment, the switch 30 is elongated, and a sectional shape of the switch 30 depicted in FIG. 9 is U-shaped. The switch 30 includes a second main body 31, which is clad in a second insulating coat 32, wherein the second main body 31 is rigid, and made of metal. The switch 30 further includes two lateral boards 301 which are parallel to each other, and the second insulating coat 32 has two covering portions 320 protruded from the two lateral boards 301 respectively. When the gate 20 is moved to the first position P1, the two covering portions 320 cover the two first abutting portions 221 respectively (shown in FIG. 7 to FIG. 9). Furthermore, the two covering portions 320 are obvious to see and touch, and are adapted to be held by fingers or a web of a hand in order to drive the switch 30 to pivot. With such design, a hand of a user would not get pinched while using the eyehook 100.

In the embodiment, both the second insulating coat 32 and the first insulating coat 22 are made of insulating plastic steel (PVC). The second insulating coat 32 has two second abutting portions 321, and each of the second abutting portions 321 extends toward one of the first abutting portions 221. The second main body 31 has a second outer surface S2 beneath each of the second abutting portion 321. In other words, the second outer surface S2 is cover by the second insulating coat 32. For explanatory purpose, the structures of the switch 30 and the gate 20 are described in one side thereof as follows.

Figure 4:
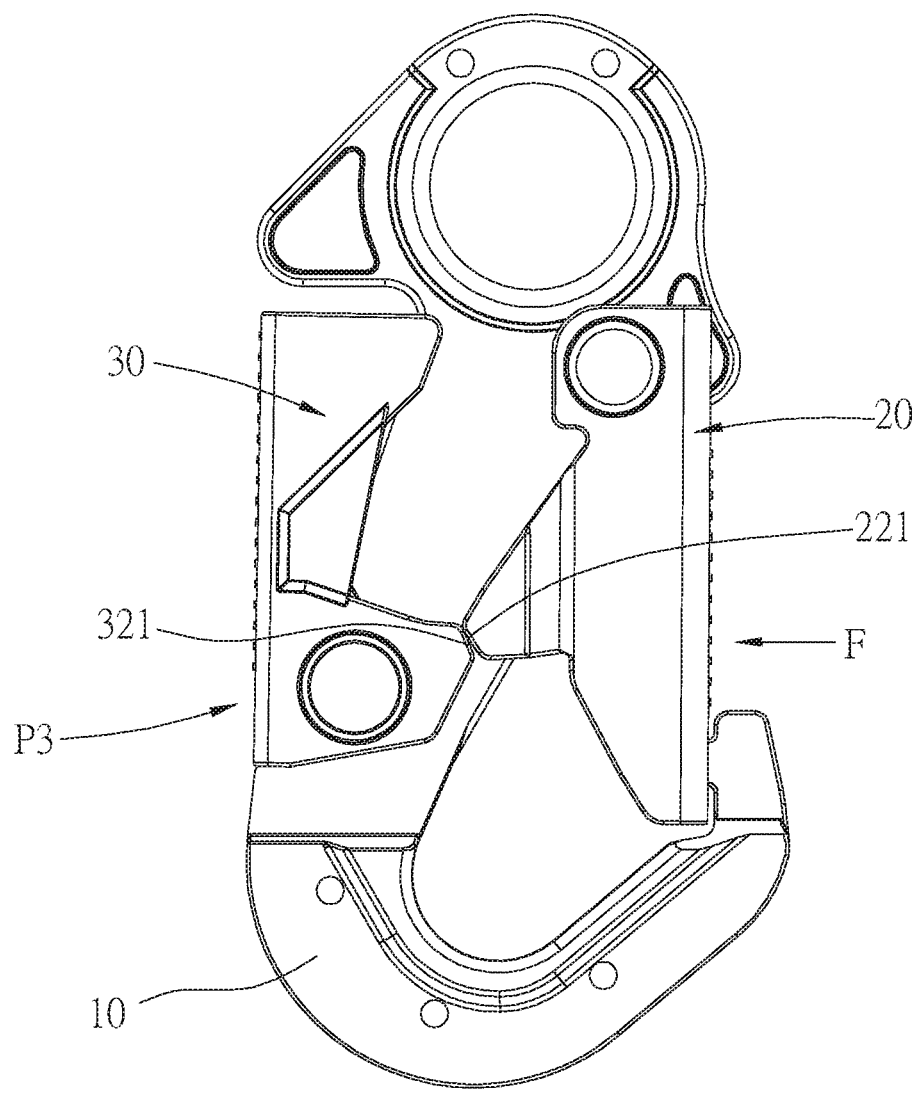
FIG. 4 is a schematic diagram of the embodiment, showing the first abutting portion abuts against the second abutting portion.

As shown in FIG. 3 and FIG. 4, when the switch 30 is moved to the third position P3, the second abutting portion 321 of the second insulating coat 32 is on the movement pathway for the gate 20 from the second position P2 toward the first position P1 in order to abut against the first abutting portion 221 to prevent the gate 20 from pivotally moving toward the first position P1. With such design, the range of movement of the gate 20 is restricted to prevent the hung object from falling off by an accidental hit.

When the switch 30 is moved to the third position P3, and the gate 20 is moved to the second position P2, a gap G1 is formed between the first abutting portion 221 and the second abutting portion 321 as shown in FIG. 3, which makes the switch 30 pivotally move without being interfered by the gate 20 when the gate 20 is positioned in the second position P2.

As illustrated in FIG. 5 and FIG. 6, when the gate 20 is forcefully hit, and therefore the first abutting portion 221 and the second abutting portion 321 which are supposed to abut against each other are broken, the first outer surface S1 beneath the first abutting portion 221 of the first main body 21 would abut against the second outer surface S2 beneath the second abutting portion 321 of the second main body 31.

In the embodiment, the first outer surface S1 and the second outer surface S2 which abut against each other are parallel, so as to form a bigger contact area, which reduces the chance of cracking the second main body 31. Additionally, when the gate 20 is forcefully hit by a force F, the switch 30 would also receive a force Fr sent from the gate 20. When the gate 20 abuts against the switch 30, a perpendicular foot P of the first outer surface S1 of the first main body 21 passing through the rotation axis A of the switch 30 falls on the first outer surface S1. In other words, a component Fx of the force Fr in the normal direction of the first outer surface S1 passes through the pin B2. Therefore, the component Fx would not generate a rotation torque, but the rigid pin B2 receives the component Fx instead, and thus the eyehook 10 is able to withstand a greater external force. In addition, another component Fy would generate a low rotation torque which may not damage the structure of the eyehook 10. Furthermore, the outer diameter of the pin B2 is large enough, such that a vertical line L on the first outer surface S passes through the pin B2 when the gate 20 abuts against the switch 30, which makes the pin B2 receive the component Fx as aforementioned.

The switch 30 can be driven to pivotally move to the fourth position P4 (shown in FIG. 7) through the covering portions 320 to make the second abutting portion 321 move away from the first abutting portions 221. Afterwards, the gate 20 can be pressed and driven to move to the first position P1 (shown in FIG. 8) to make the first abutting portions 221 of the gate 20 be covered by the covering portions 320 of the switch 30. With such design, a hand of a user would not get pinched while driving the gate 20 and the switch 30.

In addition, because the second abutting portion 321 of the switch 30 is on the movement pathway for the first abutting portion 221, the gate 20 would not be prone to pivotally move even the gate 20 is accidentally hit. Even when the eyehook 100 is further forcefully hit, and the first abutting portion 221 and the second abutting portion 321 which are supposed to abut against each other are accordingly broken, the intensity of the second main body 31 is strong enough to withstand a greater external force, to reduce the chance of cracking the eyehook 100, and to enhance the safety in use.

It must be pointed out that the embodiments described above are only some preferred embodiments of the present invention. All equivalent structures which employ the concepts disclosed in this specification and the appended claims should fall within the scope of the present invention.

What is claimed is:

1. An eyehook, comprising:
    a main hook, which comprises a first portion, a second portion, and a hook portion, wherein the main hook has an opening provided thereon;
    a gate, which is pivotally connected to the second portion of the main hook, wherein the gate is pivotally movable between a first position and a second position; when the gate is moved to the second position, a free end thereof abuts against an inner side of a free end of the hook portion to close the opening; the gate comprises a first main body and a first insulating coat, wherein the first main body is clad in the first insulating coat; the first insulating coat has a first abutting portion; and
    a switch, which is pivotally connected to the first portion of the main hook, wherein the switch is pivotally movable between a third position and a fourth position; the switch comprises a second main body and a second insulating coat, wherein the second main body is clad in the second insulating coat, and the second insulating coat has a second abutting portion; when the switch is moved to the third position, the switch abuts against the first abutting portion of the first insulating coat to prevent the gate from pivotally moving from the second position toward the first position; the switch further comprises a covering portion, which covers the first abutting portion when the gate is moved to the first position.

2. The eyehook of claim 1, wherein the first main body has a first outer surface beneath the first abutting portion, and the second main body has a second outer surface beneath the second abutting portion; when the first main body abuts against the second main body, the first outer surface is parallel to the second outer surface.

3. The eyehook of claim 1, wherein the main hook has a first protrusion provided outside of the second portion; when the gate is moved to the second position, the first protrusion extends out of an outer surface of the gate.

4. The eyehook of claim 1, wherein the switch comprises a lateral board; the covering portion is protruded from the lateral board.

5. The eyehook of claim 1, wherein the main hook has a second protrusion; when the switch is moved to the third position, the second protrusion extends out of an outer surface of the switch on a side opposite to where the switch is pivotally connected to the main hook.

6. The eyehook of claim 1, wherein when the gate is moved to the second position, and the switch is moved to the third position, a gap is formed between the first abutting portion and the second abutting portion.

7. An eyehook, comprising:
    a main hook, which comprises a first portion, a second portion, and a hook portion, wherein the first portion is provided between the second portion and the hook portion; the main hook has an opening provided thereon;
    a gate, which is pivotally connected to the second portion of the main hook, wherein the gate is pivotally movable between a first position and a second position; when the gate is moved to the second position, a free end thereof abuts against an inner side of a free end of the hook portion to close the opening; the gate comprises a first main body and a first insulating coat, wherein the first main body is clad in the first insulating coat; the first insulating coat has a first abutting portion; and
    a switch, which is pivotally connected to the first portion of the main hook, wherein the switch is pivotally movable between a third position and a fourth position; the switch comprises a second main body and a second insulating coat, wherein the second main body is clad in the second insulating coat, and the second insulating coat has a second abutting portion; when the switch is moved to the third position, the switch abuts against the first abutting portion of the first insulating coat to prevent the gate from pivotally moving from the second position toward the first position;
    wherein, the switch is pivotally connected to the main hook through a pin; the first main body has a first outer surface beneath the first abutting portion; when the gate abuts against the switch, a vertical line on the first outer surface passes through the pin.

8. The eyehook of claim 7, wherein the second main body has a second outer surface beneath the second abutting portion; when the first main body abuts against the second main body, the first outer surface is parallel to the second outer surface.

9. The eyehook of claim 7, wherein when the gate is moved to the second position, and the switch is moved to the third position, a gap is formed between the first abutting portion and the second abutting portion.

10. The eyehook of claim 7, wherein the switch further comprises a covering portion, which covers the first abutting portion when the gate is moved to the first position.

11. The eyehook of claim 10, wherein the switch comprises a lateral board; the covering portion is protruded from the lateral board.

12. The eyehook of claim 7, wherein the main hook has a first protrusion provided outside the second portion; when the gate is moved to the second position, the first protrusion extends out of an outer surface of the gate.

13. The eyehook of claim 7, wherein the main hook has a second protrusion; when the switch is moved to the third position, the second protrusion extends out of an outer surface of the switch on a side opposite to where the switch is pivotally connected to the main hook.

14. An eyehook, comprising:
a main hook, which comprises a first portion, a second portion, and a hook portion, wherein the first portion is provided between the second portion and the hook portion; the main hook has an opening provided thereon;
a gate, which is pivotally connected to the second portion of the main hook, wherein the gate is pivotally movable between a first position and a second position; when the gate is moved to the second position, a free end thereof abuts against an inner side of a free end of the hook portion to close the opening; the gate comprises a first main body and a first insulating coat, wherein the first main body is clad in the first insulating coat; the first insulating coat has a first abutting portion; and
a switch, which is pivotally connected to the first portion of the main hook, wherein the switch is pivotally movable between a third position and a fourth position; the switch comprises a second main body and a second insulating coat, wherein the second main body is clad in the second insulating coat, and the second insulating coat has a second abutting portion; when the switch is moved to the third position, the switch abuts against the first abutting portion of the first insulating coat to prevent the gate from pivotally moving from the second position toward the first position;

wherein, the switch has a rotation axis, and the first main body has a first outer surface beneath the first abutting portion; when the gate abuts against the switch, a perpendicular foot of the first outer surface passing through the rotation axis falls on the first outer surface.

15. The eyehook of claim 14, wherein the second main body has a second outer surface beneath the second abutting portion; when the first main body abuts against the second main body, the first outer surface is parallel to the second outer surface.

16. The eyehook of claim 14, wherein when the gate is moved to the second position, and the switch is moved to the third position, a gap is formed between the first abutting portion and the second abutting portion.

17. The eyehook of claim 14, wherein the switch further comprises a covering portion, which covers the first abutting portion when the gate is moved to the first position.

18. The eyehook of claim 17, wherein the switch comprises a lateral board; the covering portion is protruded from the lateral board.

19. The eyehook of claim 14, wherein the main hook has a first protrusion provided outside the second portion; when the gate is moved to the second position, the first protrusion extends out of an outer surface of the gate.

20. The eyehook of claim 14, wherein the main hook has a second protrusion; when the switch is moved to the third position, the second protrusion extends out of an outer surface of the switch on a side opposite to where the switch is pivotally connected to the main hook.

* * * * *